Aug. 27, 1963 H. WIECHMANN 3,101,503
DEVICE FOR CLEANING BAKING TINS
Filed July 25, 1961
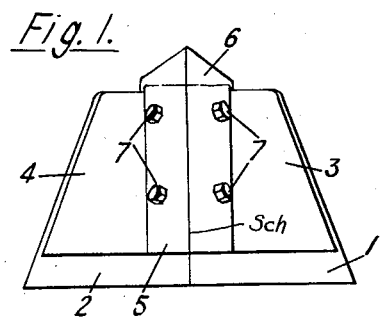
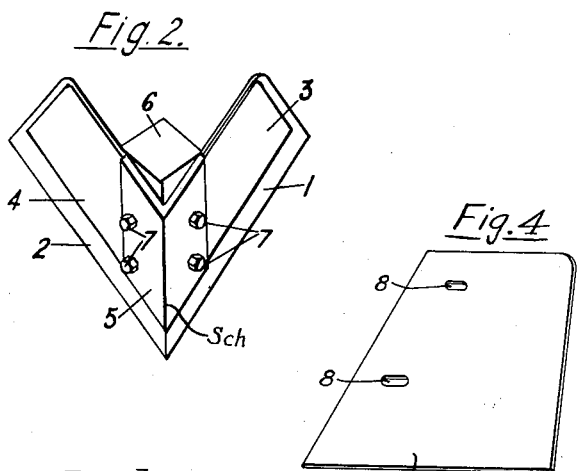
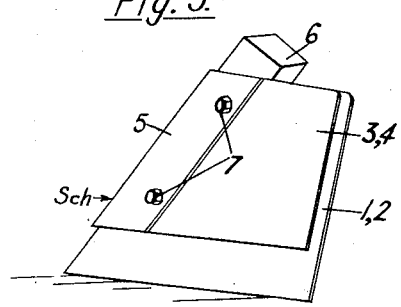

3,101,503
DEVICE FOR CLEANING BAKING TINS
Herbert Wiechmann, 19 Liethwisch, Hamburg-
Lokstedt 1, Germany
Filed July 25, 1961, Ser. No. 126,576
Claims priority, application Germany July 25, 1960
2 Claims. (Cl. 15—236)

It is a known fact that confectioners and bakers use sheet steel scrapers applied by hand for cleaning baking tins, whereby the hand of the user must find the most appropriate angle of incidence. The present invention is intended to eliminate the resultant time-consuming and enervating work in that the scraper has scraper sheets which are adjustably mounted at an angle toward each other.

In this manner, and especially by the fact that the scraper sheets, are of triangular or polygonal shape in horizontal plan, and are inclined on a compound angle to the horizontal, the advantages result which this invention purports.

The scraper sheets which support the device during use are preferably so arranged that the apex of the inclined scraper sheets is designed as a joint to facilitate the individual adjustment of the angle of incidence of the scraper sheets toward the baking tin.

In the drawing one possible design arrangement is shown.

The illustration shows:
FIG. 1 an end view,
FIG. 2 a plan view,
FIG. 3 a side view of the device, and
FIG. 4 is a side elevation view of one of the scraper sheets.

This device, designed as a scraper, consists of two scraper sheets 1 and 2 adapted to be connected together at an acute angle one to the other, each having clamping plate 3 and 4 respectively, a clamping member 5 of angle section, all of which are braced together and supported on a base member 6 of square section by means of screws 7 or suitable fastener elements.

The scraper blades or sheets 1 and 2 are adjustably fitted and secured on the base member 6 with respect to each other by means of slots 8 in the plates through which the fastener elements 7 extend in such a manner that the angle of the scraper blades or sheets 1 and 2 can be changed as desired. The scraper sheets 1 and 2 extend a suitable distance below the edge of the plates 3 and 4 (see FIG. 3), thus ensuring optimum flexibility of the scraper blade edge.

The apex *Sch* of the device is formed by the angle member 5 which forms a clamping joint between the base member 6 and the scraper blades 1 and 2. To facilitate alteration of the angle of incidence of the scraper sheets the fastener elements 7 are loosened and the scraper blades 1 and 2 are adjusted to their proper angle and the fastener elements 7 are again tightened in place.

A third scraper sheet may be provided so that the device is given a triangular shape. Even more than three scraper sheets may be fitted. The blades 1 and 2 of the device have a polygonal shape and each blade is provided with upper and lower parallel edges and a front angular edge extending at an acute angle to the lower edge of the blade.

The device is manually applied without handle, and it is evident that, by applying the device in a zigzag motion over the baking tin, the latter can be cleaned in half the time previously required. Since the device is placed on the baking tin the lower edges of the scraper blades 1 and 2 assume a proper angle with respect thereto and, the work will be easier.

What I claim is:
1. A scraper for cleaning baking tins and the like, comprising a support of square section adapted to be presented to the baking tin at an acute angle, a pair of scraper sheets secured to two adjacent faces of said support so that an angle is formed between said sheets, a clamping member of angle section covering the major length of the adjacent edges of said scraper sheets, and threaded fasteners for securing said sheets and member of angle section to said support, said sheets being of parallelogrammatic shape with one of their edges forming an acute angle with the lower parallel edges thereof, said edges meeting along one corner of said supporting member of square section, said sheets extending in planes on a compound angle with respect to one another and beyond said adjacent faces of said support to which they are secured.

2. A scraper for cleaning baking tins and the like, comprising a support of square section adapted to be presented at an oblique angle to the baking tin surface to be cleaned, a pair of scraper sheets of parallelogrammatic shape having each an edge extending oblique to the parallel edges thereof and secured to two adjacent faces of said support and meeting with said oblique edges along one corner edge thereof, a member of angle section covering the major portion of said oblique edges, and fasteners extending through said member of angle section and through said scraper sheets and into said support for clamping said sheets to said support, said sheets being provided with slots through which said fasteners extend, said slots permitting an angular adjustment of said sheets relatively to one another.

References Cited in the file of this patent

UNITED STATES PATENTS

| D. 32,537 | Robbins | Apr. 17, 1900 |
|---|---|---|
| 161,181 | Tuckerman | Mar. 23, 1875 |
| 2,094,424 | Cole | Sept. 28, 1937 |

FOREIGN PATENTS

| 385,688 | Germany | Dec. 11, 1923 |
|---|---|---|
| 1,092,816 | Germany | Nov. 10, 1960 |